Figure 1:
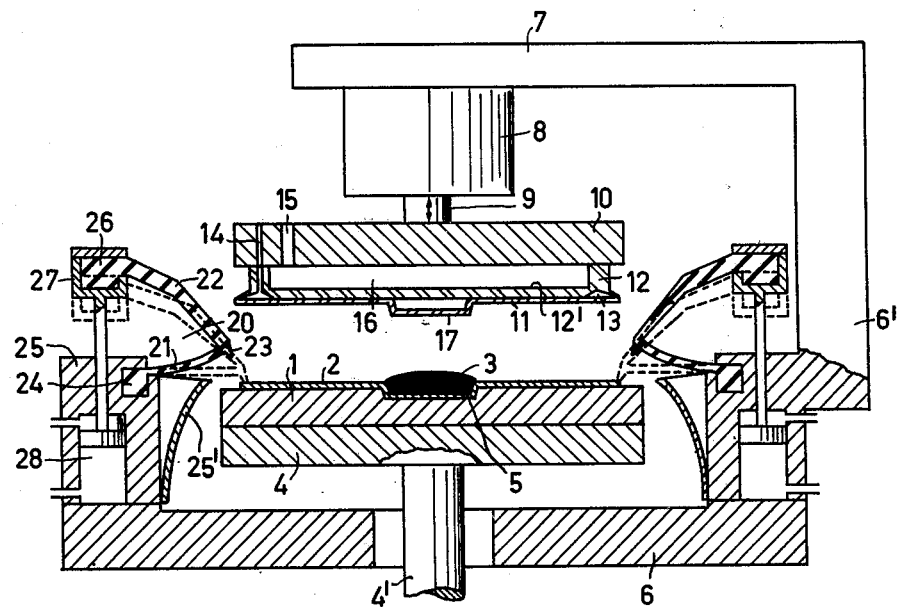

United States Patent [19]

Broeksema et al.

[11] 4,301,099

[45] Nov. 17, 1981

[54] METHOD AND DEVICE FOR MANUFACTURING A PLASTICS RECORD CARRIER

[75] Inventors: Egbert Broeksema; Arnoldus A. Smeets, both of Eindhoven, Netherlands

[73] Assignee: U.S. Philips Corporation, New York, N.Y.

[21] Appl. No.: 102,720

[22] Filed: Dec. 13, 1979

[30] Foreign Application Priority Data

Aug. 10, 1979 [NL] Netherlands .................. 7906117

[51] Int. Cl.³ ........................................... B29D 17/00
[52] U.S. Cl. ..................................... 264/25; 264/107; 264/266; 264/316; 264/341; 425/810
[58] Field of Search ................. 425/174.4, DIG. 810; 264/107, 311, 314, 316, 25, 266, 341

[56] References Cited

U.S. PATENT DOCUMENTS

| | | | |
|---|---|---|---|
| 1,146,413 | 7/1915 | Edison | 264/107 X |
| 2,524,862 | 10/1950 | White | 425/174.4 X |
| 2,539,717 | 1/1951 | Balmer | 264/311 X |
| 3,128,322 | 4/1964 | Young | 264/314 |
| 4,032,610 | 6/1977 | Spiller | 264/107 |

FOREIGN PATENT DOCUMENTS 1104204  4/1961  Fed. Rep. of Germany ...... 264/107

Primary Examiner—Thomas P. Pavelko
Attorney, Agent, or Firm—Thomas A. Briody; William J. Streeter; Algy Tamoshunas

[57] ABSTRACT

A method and device for manufacturing a record carrier is disclosed in which a liquid moulding resin is deposited in a cavity formed in the surface of a mould which also has at least one data track. Thereafter a flexible substrate, having a central projection, is deformed into a convex shape and is pressed against the moulding resin. As the projection on the substrate enters the mating cavity in the mold, the resin is squeezed out of the cavity and rolled out across the mould surface by the substrate which is flattened into a planar form during the pressing step. The moulding resin is then cured and the assembly of the substrate with attached, cured resin layer is removed from the mould.

3 Claims, 3 Drawing Figures

METHOD AND DEVICE FOR MANUFACTURING A PLASTICS RECORD CARRIER

The invention relates to a method of manufacturing a plastic record carrier having a stratified structure in which a liquid moulding resin is centrally deposited on a mould surface which has at least one data track. Thereafter a spherosymmetrically vaulted flexible substrate is pressed against the resin so that the resin is rolled out over the mould surface and the vaulted substrate is deformed to form a plane surface. The resin is then cured and the assembly of substrate with attached cured resin layer is removed from the mould.

Such a method is described in Netherlands Patent Application 77 02 702 laid open to public inspection which corresponds to pending U.S. application Ser. No. 124,878, filed Feb. 26, 1980.

This known method utilizes a flat supporting plate on which a flat mould is arranged. In the centre of this mould a quantity of moulding resin is introduced, after which a spherically vaulted substrate is moved towards the mould.

The spherical vaulting of the mould serves to roll out the moulding resin from the centre without air inclusions. However, it has been found that this cannot be fully realized by means of the known method.

From said Netherlands Patent Application it is also known to manufacture discs having a central hole. This is realized by means of a supporting plate and a mould provided with a central boss. In that case, it is not possible to introduce the moulding resin exactly in the centre, and again problems are encountered as regards air inclusions.

The object of the invention is to provide a method of and a device for manufacturing plastic record carriers in which air inclusions in the layer of moulding resin are substantially precluded.

The invention is based on the recognition of the fact that in the known method a static charge is present on the substrate which, when the substrate moves towards the resin, pulls the resin to the substrate before the substrate reaches the resin surface. Because according to the known method and device the moulding resin forms a pool of substantial dimensions around the centre of the mould, it may occur that instead of the moulding resin in the centre being drawn to the substrate, a ring of moulding resin around the centre is drawn to the substrate. Such a ring may enclose an air bubble which is distributed throughout the moulding resin during the subsequent rolling out.

In order to avoid this effect and to provide a plastic record carrier of improved quality, the method in accordance with the invention is characterized in that the centre of the mould is provided with a cavity, which is suitably centrically situated with respect to the data track, and the plastic substrate is provided with a boss which corresponds to the cavity in the mould.

With this arrangement the moulding resin is in first instance, suitably centred in the cavity, while the central part of the substrate, i.e. the top surface of the boss, first arrives in the vicinity of the moulding resin. Thus, should jumping of moulding resin occur due to the static charge on the substrate, such jumping would take place in the centre, so that no air bubble would be included.

In a further preferred embodiment, the cavity and the boss have oblique sides. The finished product can thus be readily removed from the mould.

In a method of this kind the resin is usually cured by light which acts on the moulding resin through the transparent substrate. After the curing, substrate with the attached, cured moulding resin layer can be removed from the mould. A difficulty is then encountered in that an uncured zone is often present near the edge. When the record carrier is detached from the mould, droplets of uncured resin are often sucked between the record carrier and the mould. These droplets adhere to the record carrier and give rise to undesirable disturbances.

In a further preferred version of the method in accordance with the invention, these difficulties are eliminated in that, after the positioning of the substrate on the mould, the edge of the substrate is covered, the resin is then exposed to light. The cover is removed from the edge after curing and the uncured resin is flushed away by centrifuging with a suitable solvent.

The invention also relates to a device for performing the described method, which is characterized in that the mould has a cavity which is suitably centrically situated with respect to the data track and means are provided for covering the edge of the substrate.

In a further preferred embodiment, the means for covering the edge of the substrate are formed by a flexible ring which is comprised of a first flexible ring, which is situated mainly in a plane parallel to the supporting plate of the mould, and a second flexible ring which is connected to the inner edge of the first ring and which extends in a conical plane which encloses an angle with the plane in which the first ring is situated. The outer edge of the first ring is clamped in a first structural member which is rigidly arranged approximately in the plane of the mould, the outer edge of the second ring being clamped in an annular second structural member which is movable in a direction transversely of the plane of the mould.

It is to be noted that the method and the device in accordance with the invention can also be used in cases where the positions of mould and substrate are reversed, i.e. when the substrate is arranged on a flat base and comprises a central cavity for the moulding resin, whilst the mould is vaulted and subsequently pressed against the moulding resin on the substrate.

The invention will be described in detail hereinafter with reference to the accompanying diagrammatic drawing.

Figure 2:
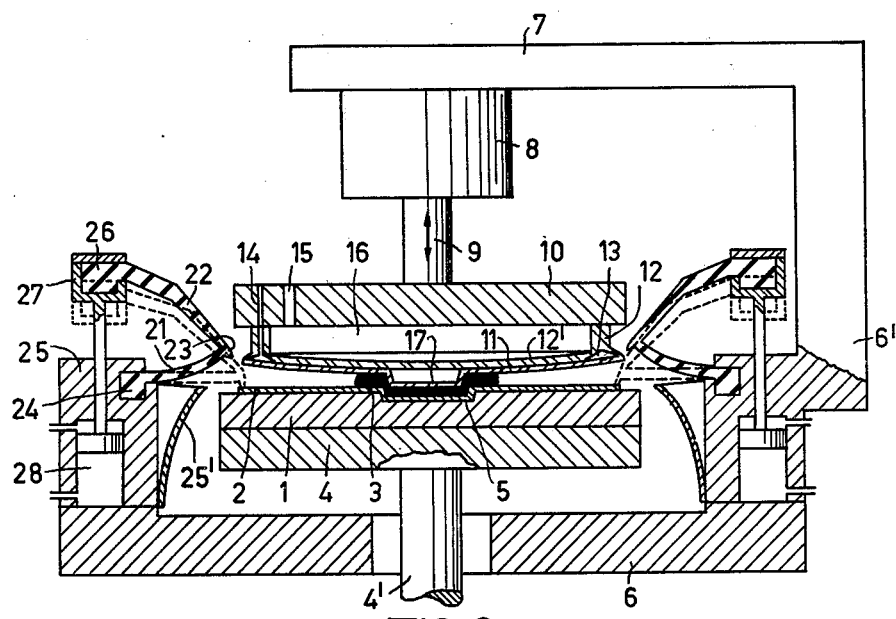
Figure 3:
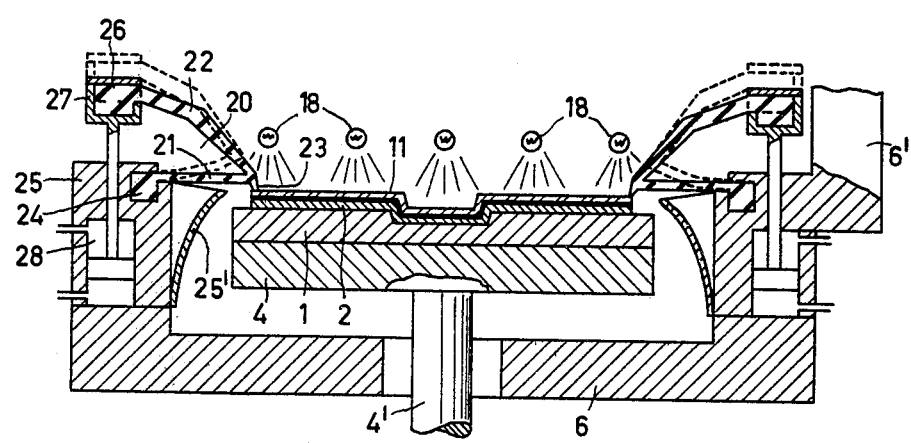

The FIGS. 1, 2 and 3 are sectional views of a device for manufacturing record carriers, in three phases of the method to be performed.

The reference numeral 1 in FIG. 1 denotes a supporting plate for a nickel mould 2 whose side which is remote from the supporting plate is provided with a data track. The supporting plate and the mould 2 are both provided with a cavity 5 which is situated centrally with respect to the data track. A quantity 3 of an ultraviolet-curable moulding resin on the basis of an acrylic acid ester is introduced into the cavity 5. The supporting plate 1 is connected to a plate 4 which is connected to a spindle 4' of a centrifuge (not shown). A table 6 comprises a column 6' with an arm 7. A linear motor 8 is connected to the arm 7 and comprises a shaft 9 which can be moved up and down in the indicated directions by means of the motor 8. The shaft 9 comprises a holder 10 for a flexible substrate 11. The holder 10 supports a collar 12 with an intermediate flexible diaphragm 12' which is integral therewith and which is made of a deformable material such as rubber. At its end face which is remote from the holder 10, the collar 12 comprises an annular suction cup 13. The collar 12 and the holder 10 have a duct 14 which connects the suction cup 13 to a vacuum pump (not shown). The flexible substrate 11, is made of ultra-violet light pervious material such as plexiglass and can thus be sucked against the collar 12 and the diaphragm 12'. The holder 10 has a further duct 15 which extends into the otherwise airtight space 16 which is bounded by the holder 10, the collar 12 and the diaphragm 12'. Via the duct 15, a pressure increase can be realized in the space 16 by means of a pressure pump (not shown). The substrate 11 has a boss 17 which has the same shape and slightly smaller dimensions than the cavity 5 in the mould.

The method performed by means of the device is as follows.

Due to the overpressure created in the space 16, the substrate 11 will be spherosymmetrically vaulted i.e. deformed into a convex shape. The assembly formed by the holder 10 with the collar 12, the diaphragm 12', the suction cup 13 and the vaulted substrate 11 sucked thereto is displaced by the motor 8 in the direction of the supporting plate 1 with the mould 2 and the moulding resin 3. The boss 17 will first contact the moulding resin in the cavity 5. When, due to the static electricity on the substrate, the moulding resin jumps when the distance between the substrate and the mould becomes small, jumping will take place at the area of the boss 17 and the cavity 5, that is in a very central location, thus precluding the inclusion of air bubbles. As the holder 10 with the substrate moves further, the moulding resin is rolled out over the mould 2 by the vaulted substrate and the moulding resin is then spread across the mould with a circular fluid front, the vaulted substrate being flattened at the same time.

The situation where the moulding resin has been partly spread across the mould surface is shown in FIG. 2 in which the same reference numerals have been used as in FIG. 1.

When the substrate 11 has been flattened to a substantially planar shape and the fluid front has substantially reached the edge of the mould 2, the substrate 11 is uncoupled from the collar 12 by air admitted into the suction cup 13 via the duct 14. When the substrate 11 is uncoupled, it will rest completely flatly against the mould surface as a result of its own relaxation, thus forcing the fluid front of the resin 3 as far as the edge of the mould.

Subsequently, the edge of the substrate 11 is covered by means of a flexible ring 20. The ring 20 is comprised of a first flexible ring 21, which is mainly situated in a plane parallel to the supporting plate 1, and a second flexible ring 22 which is connected, by way of a projection 23, to the entire inner edge of the first ring. The second ring is conical which encloses an angle with respect to the first ring. The outer edge 24 of the first ring is clamped in a rigidly arranged structural member 25 which is situated at a level which is slightly higher than that of the mould 2. The outer edge 26 of the second ring is clamped in an annular structural member 27 which can be moved up and down by means of one or more linear motors 28.

Due to the construction described above, the ring 20 is shaped so that, when the annular member 27 is in its upper position (see FIG. 1), the diameter of the inner edge of the projection 23 is sufficiently large so that the substrate 11 can pass therethrough in order to be arranged on the mould.

After the substrate is positioned on the mould, the annular structural member 27 is moved downwards by means of the motor 28, so that the inner edge 23 also moves downwards, as well as slightly inwards, thus covering the edge of the substrate 11 as shown in FIG. 3.

Via the substrate 11 which engages the moulding resin without stress, the moulding resin layer is cured by irradiation by means of ultraviolet light originating from light sources 18, for example, ultraviolet light of 365 nm originating from a 500 W water-cooled high-pressure mercury lamp. The exposure time depends on, for example, the thickness of the moulding resin layer which may vary from 1 to 300 $\mu$m, but which preferably amounts to from 1 to 75 $\mu$m, on the composition of the moulding resin, on the light intensity, and on the thickness of the substrate, which usually amounts to from 1 to 3 mm. Generally, the exposure time will vary from a few seconds to a few minutes.

The outer edge of the substrate which is covered by the ring 20 and the moulding resin present therebelow is not exposed in first instance. Subsequently, the ring 20 is removed by moving the motor 28 and the ring 27 upwards, after which the uncured synthetic resin is flushed away by centrifuging with a suitable solvent. The exposure may continue during so that the centrifuging, the moulding resin present between the substrate and the mould may also continue to be cured.

Dissolved moulding resin which is spun off by the flushing and centrifuging is discharged via a collector 25'.

Subsequently, the substrate with the attached, cured moulding resin can be removed from the mould without the risk of any residual, non-cured moulding resin penetrating between the substrate and the mould.

The record carrier thus obtained comprises a boss with walls which are accurately defined with respect to the data track. These walls can be used as a reference plane during the cutting of the central aperture.

On its side accommodating the moulding resin layer containing the data, the plastics record carrier obtained usually comprises an aluminium layer which has a thickness of from 50 to 100 nm and which is provided in a vacuum bell by vapour deposition. Finally, a protective layer of lacquer is provided on the aluminium layer.

What is claimed is:

1. A method of manufacturing a record carrier having a stratified structure comprising the steps of introducing a liquid resin into a cavity formed in the centre of a mould, said mould having at least one data track formed in the surface thereof extending about said cavity, positioning a planar, flexible substrate opposite said surface of said mould, said substrate having a projection formed in the centre thereof configured to mate with said cavity, deforming said substrate into a convex form bulging toward said mould, moving said substrate toward said mould so that said projection enters said cavity and squeezes said resin in said cavity onto said surface of said mould, changing the configuration of said substrate from said convex to a planar form while pressing said substrate against said resin so that said resin is rolled out over said surface of said mould, and curing said resin so that it adheres to said substrate to form said stratified structure.

2. The method according to claim 1 wherein said cavity and said projection have oblique sides.

3. The method according to claim 1 or 2 wherein said resin is radiation curable and said substrate is substantially transparent to the radiation with which said resin is curable, and including the steps of covering the periphery of said substrate, exposing said resin to radiation through said substrate to thereby cure said resin, uncovering said periphery of said substrate, centrifuging said substrate with said cured resin adhered thereto and flushing away the uncured resin on said periphery with a solvent.

* * * * *